US008848590B2

(12) United States Patent
Kakani et al.

(10) Patent No.: US 8,848,590 B2
(45) Date of Patent: Sep. 30, 2014

(54) MULTICAST GROUP MANAGEMENT IN WIRELESS NETWORKS

(75) Inventors: Naveen Kumar Kakani, Coppell, TX (US); Tuomas Valtteri Laine, Vantaa (FI)

(73) Assignee: Nokia Corporation, Espoo (FI)

( * ) Notice: Subject to any disclaimer, the term of this patent is extended or adjusted under 35 U.S.C. 154(b) by 144 days.

(21) Appl. No.: 12/888,537

(22) Filed: Sep. 23, 2010

(65) Prior Publication Data
US 2011/0069652 A1 Mar. 24, 2011

Related U.S. Application Data

(60) Provisional application No. 61/277,485, filed on Sep. 24, 2009.

(51) Int. Cl.
H04H 20/71 (2008.01)
H04L 12/18 (2006.01)
H04H 20/61 (2008.01)

(52) U.S. Cl.
CPC .............. H04L 12/185 (2013.01); *H04H 20/61* (2013.01)
USPC ........................................................ 370/312

(58) Field of Classification Search
None
See application file for complete search history.

(56) References Cited

U.S. PATENT DOCUMENTS

| | | | | |
|---|---|---|---|---|
| 6,028,866 A * | 2/2000 | Engel et al. | .................... | 370/461 |
| 2002/0097728 A1 * | 7/2002 | Hinderks et al. | ......... | 370/395.52 |
| 2003/0036398 A1 * | 2/2003 | Asakawa | ...................... | 455/503 |
| 2004/0019696 A1 * | 1/2004 | Scott et al. | .................... | 709/242 |
| 2004/0255329 A1 * | 12/2004 | Compton et al. | ............. | 725/109 |
| 2005/0195823 A1 * | 9/2005 | Chen et al. | .................. | 370/395.1 |
| 2005/0213579 A1 * | 9/2005 | Iyer et al. | .................... | 370/395.2 |
| 2006/0018319 A1 | 1/2006 | Palin et al. | .................... | 370/390 |
| 2006/0146184 A1 * | 7/2006 | Gillard et al. | .............. | 348/398.1 |
| 2006/0164550 A1 * | 7/2006 | Yoshimoto et al. | ........... | 348/571 |
| 2007/0174478 A1 * | 7/2007 | Ryu et al. | ...................... | 709/231 |
| 2008/0151814 A1 * | 6/2008 | Jokela | ............................ | 370/328 |
| 2009/0279470 A1 * | 11/2009 | Seok | .............................. | 370/312 |
| 2009/0290524 A1 * | 11/2009 | Seok | .............................. | 370/312 |
| 2011/0047127 A1 * | 2/2011 | Scott et al. | ..................... | 707/632 |
| 2011/0047293 A1 * | 2/2011 | Scott et al. | ..................... | 709/242 |
| 2011/0055416 A1 * | 3/2011 | Chen et al. | ..................... | 709/231 |
| 2011/0158145 A1 * | 6/2011 | Gong et al. | ..................... | 370/312 |
| 2011/0276711 A1 * | 11/2011 | Gong et al. | ..................... | 709/231 |

OTHER PUBLICATIONS

Gong, et al, "PWG-2009-00yy-00-PAL-Multicast-Group-Management", Intel Corporation, Sep. 3, 2009, (12 pages).

* cited by examiner

*Primary Examiner* — Suk Jin Kang
(74) *Attorney, Agent, or Firm* — Harrington & Smith

(57) ABSTRACT

A source device which is a distributed device and which is not a wireless network access point advertises a multicast data stream; receives from a destination device a message indicating that the destination device wants to receive the multicast data stream; and adds the destination device to a list of destination devices for the multicast data stream, in which the list is stored in a computer readable memory. In various exemplary embodiments the advertising comprises broadcasting in a protocol adaptation layer an advertisement comprising a multicast medium access control (MAC) address and an address for the source device; or sending to a centralized controller a first message comprising the MAC address which triggers the centralized controller to broadcast an advertisement for the multicast data stream to destination devices. Prior to advertising the source device may create a multicast MAC address and check for uniqueness of the created address via signaling.

20 Claims, 7 Drawing Sheets

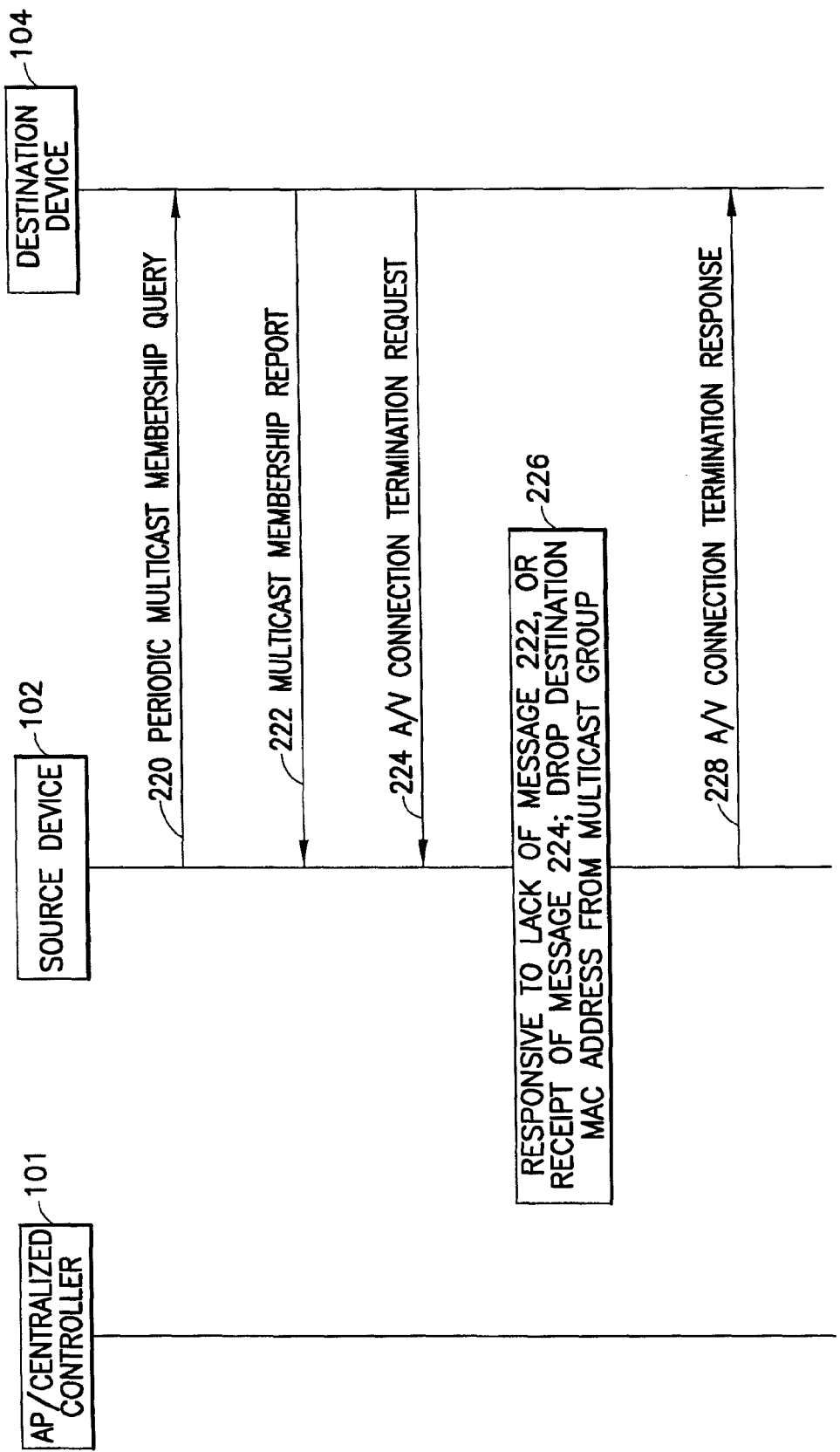

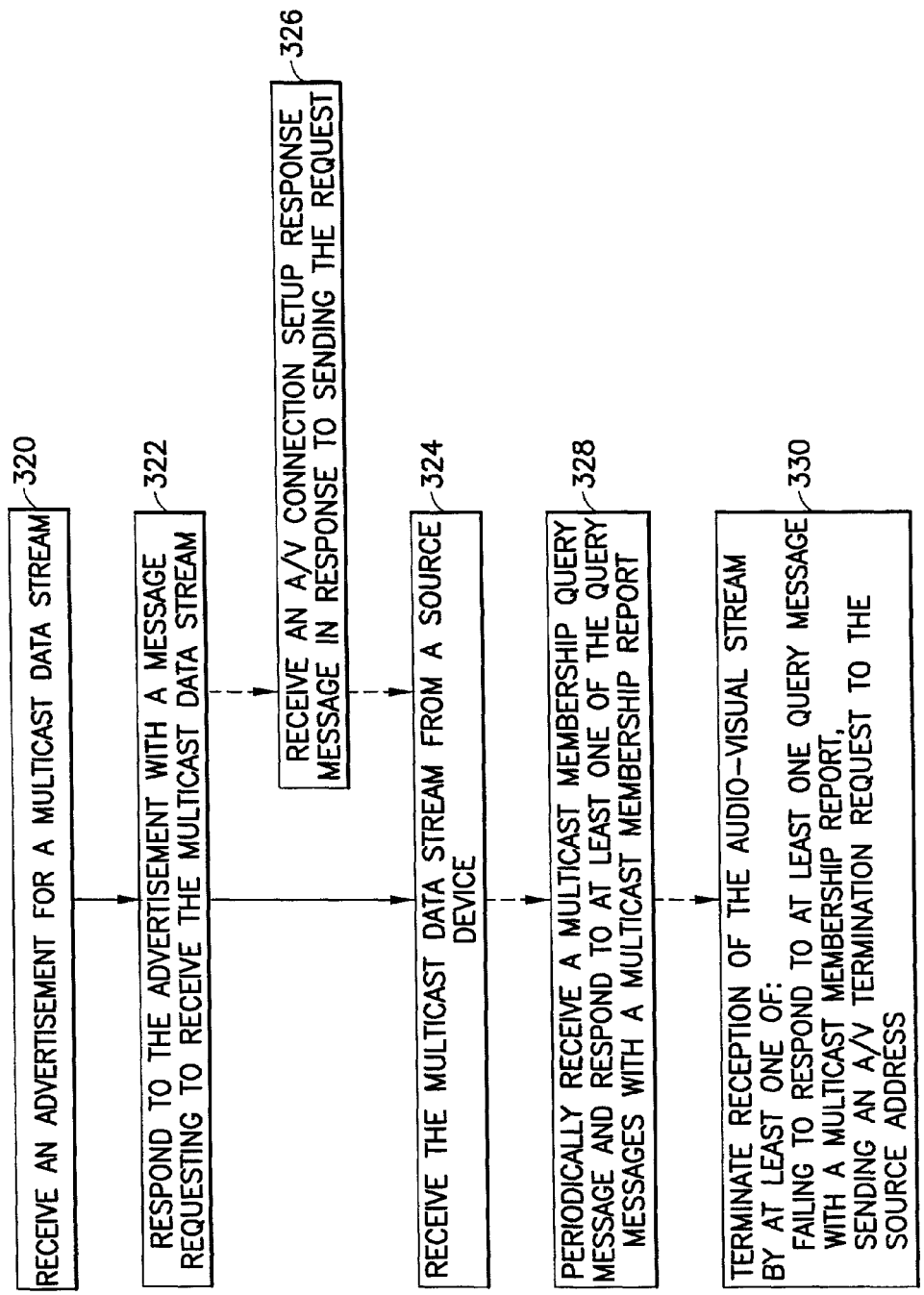

MULTICAST GROUP MANAGEMENT IN WIRELESS NETWORKS

CLAIM OF PRIORITY

This application claims priority under 35 USC §119(e) to U.S. Provisional Patent Application 61/277,485 (filed Sep. 24, 2009), the contents of which is hereby incorporated by reference in its entirety as if fully restated herein.

TECHNICAL FIELD

The exemplary and non-limiting embodiments of this invention relate generally to wireless communication systems, methods, devices and computer programs and, more specifically, relate to multicasting in a wireless network, and wherein a multicast group is established and advertised by a distributed device.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:

AID association identifier
A/V audio/visual
Gbps giga-bits per second
GHz giga-hertz
HDMI high-definition multimedia interface
IANA internet assigned numbers authority
IETF internet engineering task force
IGMP internet group management protocol
IO input-output
LSB lest significant bits
MAC medium access control layer (layer 2)
PAL protocol adaptation layer (on top of layer 2)
PCP/AP private basic service set control point/access point
PIM protocol-independent multicast
WGA wireless gigabit alliance (also known as WiGig)

The WGA group seeks to create a global standard for interoperable products operating in the 60 GHz range. It is hoped to unify the next generation of entertainment, computing and communications devices at speeds more than 10 times faster than today's wireless LANs. At this early stage of development, products based on the WGA specification are to be capable of at least 1 Gbps at a typical range of 10 meters, with some implementations anticipated at speeds exceeding 6 Gbps and at greater distances.

The 60 GHz band is seen to be complementary to both 2.4 and 5 GHz, and there is a large amount of unlicensed spectrum available at this band worldwide. The 60 GHz band can enable higher data rates because it has much more bandwidth available (7-9 GHz of spectrum) vs. 83.5 MHz in the 2.4 GHz band. Applications that require multi-gigabit per second speeds (like uncompressed video transmission) to operate will be able to run in 60 GHz.

The WGA A/V PAL working group is developing a protocol adaptation layer (PAL) for A/V interfaces such as HDMI (for uncompressed video and audio) and DisplayPort. The envisioned use cases include high speed networking, wireless display and wireless IO.

However, the A/V PAL has currently no method to address a single A/V stream to multiple destination devices simultaneously. Since the protocol stack for A/V PAL does not include an IP protocol stack, the IP networking methods for multicast group management (e.g., IGMP which is a IETF L3 protocol for managing IP multicast groups, PIM, etc.) cannot be readily used in a PAL multicast arrangement. But there are use cases that would benefit from group addressing functionality, such as for example A/V streaming to multiple display devices in a conference room, or to multiple loudspeakers in an entertainment environment.

Attached as Exhibit A to the priority document U.S. provisional patent application 60/277,485 is a proposal for WGA by the Intel Corporation (Doc # PWG-2009-00yy-00-PAL-multicast-group-management, dated Sep. 3, 2009) by which a source device may create a multicast group, choose a multicast address, and invite destination devices to join that group by sending PAL connection setup request messages in which the multicast group is identified. In this proposal the source must know the prospective destination addresses in advance; it is based on inviting destination devices to join the multicast group.

Other references that may be of interest include IEEE 802.11v multicast which is an IP based multicast technique, and co-owned EP Patent Publication EP1619832 (published Jan. 25, 2006 and entitled "Multicast and Broadcast Data Transmission in a Short-Range Wireless Communication Network"; also published as US Patent Publication US 2006/0018319).

SUMMARY

In a first aspect thereof the exemplary embodiments of the invention is an apparatus comprising a processor and a memory storing a program of computer readable instructions. The memory and the computer readable instructions are configured with the processor to cause the apparatus at least to: advertise a multicast data stream; receive from a destination device a message indicating that the destination device wants to receive the multicast data stream; and add the destination device to a list of destination devices for the multicast data stream, in which the list is stored in the memory. In this first aspect the apparatus comprises a source device for the multicast data stream which is a distributed device and which is not a wireless network access point.

In a second aspect thereof the exemplary embodiments of the invention is a method comprising: advertising a multicast data stream from a source device which is a distributed device and which is not a wireless network access point; receiving from a destination device a message indicating that the destination device wants to receive the multicast data stream; and adding the destination device to a list of destination devices for the multicast data stream, in which the list is stored in a computer readable memory.

In a third aspect thereof the exemplary embodiments of the invention is a memory storing a program of computer readable instructions which when executed by a processor perform the following actions: advertising a multicast data stream from a source device which is a distributed device and which is not a wireless network access point; receiving from a destination device a message indicating that the destination device wants to receive the multicast data stream; and adding the destination device to a list of destination devices for the multicast data stream, in which the list is stored in a computer readable memory.

BRIEF DESCRIPTION OF THE DRAWINGS

FIGS. 2A-B represent a continuing signaling diagram for A/V multicasting according to an exemplary embodiment of the invention.

FIG. 3B is a logic flow diagram that illustrates the operation from the perspective of the destination device of a method, and a result of execution of computer program instructions embodied on a computer readable memory, in accordance with an exemplary embodiments of this invention.

DETAILED DESCRIPTION

Figure 1:
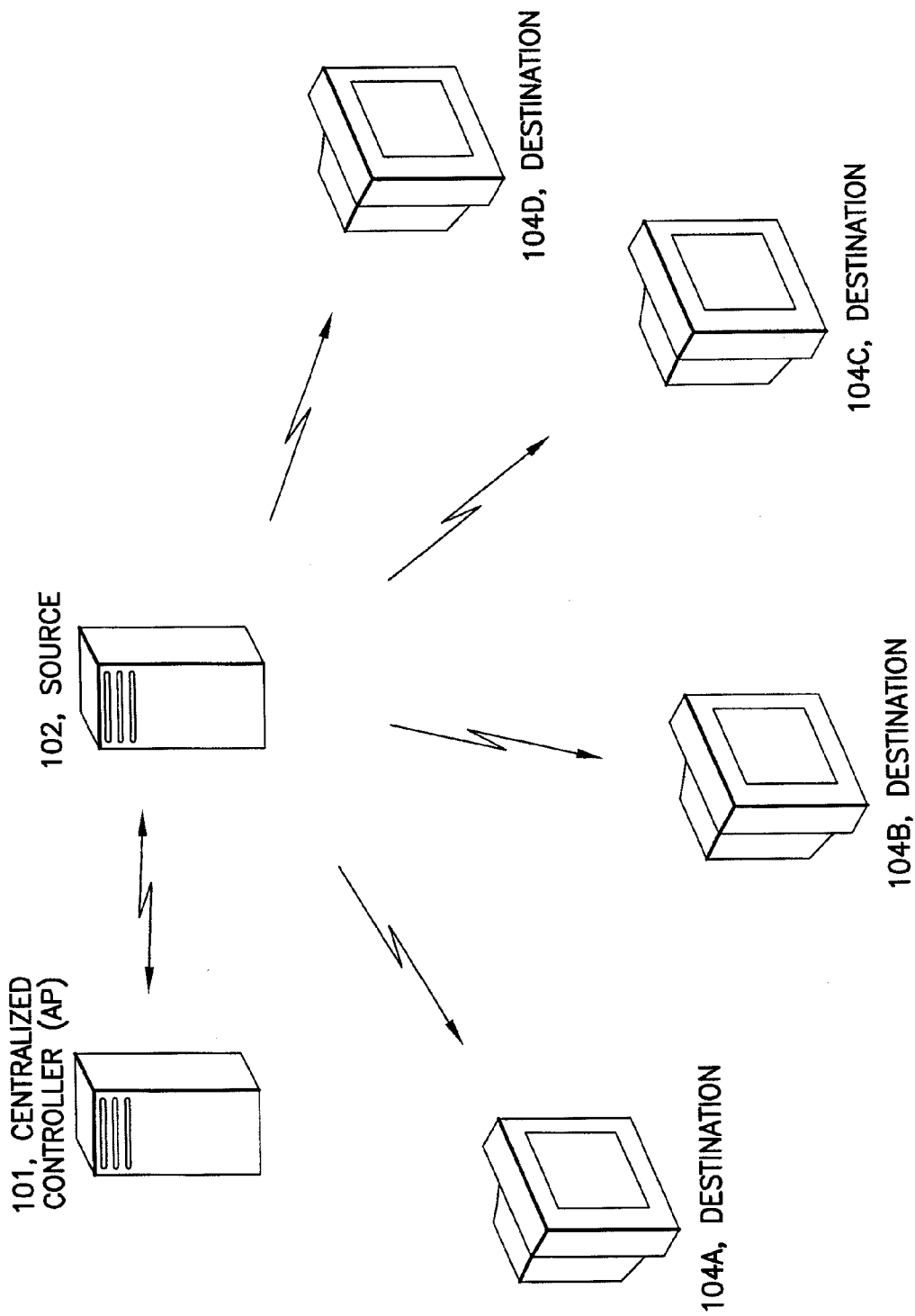
FIG. 1 is a schematic diagram showing an exemplary arrangement of devices for multicasting, in which a source PC multicasts to a plurality of video terminals.

As an overview of the short-range A/V multicast, FIG. 1 illustrates one exemplary but non-limiting example. A source device 102 such as for example a personal computer as shown, or a users mobile terminal or some other electronic device with a short-range transceiver, transmits a multicast stream such as for example uncompressed audio and/or video to a plurality of destination devices 104A-D. There may be also a centralized controller device 101 that stores all MAC addresses currently in use in the network, and which the source 102 may use to ensure the MAC address that the source 102 creates for its multicast stream(s) is unique in the network. The centralized controller 101 may lie within any of the destination devices 104A-D, within the source device 102, or may be a separate device from those as shown at FIG. 1, such as for example an access point AP for the network which is acting as neither source or destination for the multicast stream (s).

In the example of FIG. 1 the destination devices 104A-D may be video terminals which receive a video presentation (e.g., slideshow or movie) from the source device 102 but other applications for which WGA is envisioned include loudspeakers as the destination devices where the source device 102 streams music or a speaker's oration to the loudspeaker destination devices 104A-D. Generally the range between the source device 102 and the furthest destination device 104A-D may be for example 10 meters, though this range may be extended in further refinements of WGA and additionally the stream from the source device 102 may be relayed by one or more destination devices 104A-D to extend range of the streaming audio/video.

Exemplary embodiments of the invention detailed herein provide a multicasting technique, preferably for adoption into the WGA protocol, by which the source device 102 sends out an advertisement message which announces to the potential destination devices 104A-D the available multicast A/V stream or streams. The destination devices 104A-D which then elect to receive the multicast stream(s) each replies to the source device 102 with connection setup request message, for example an A/V connection setup request message. Whereas the approach suggested by Doc # PWG-2009-00yy-00-PAL-multicast-group-management (summarized in the background section above) may be considered a 'top-down' framework since the source sends requests to those destination nodes it chooses, the approach detailed herein may be considered instead a 'bottom-up' approach in that the source sends (e.g., broadcasts) a generic advertisement addressed to no specific destination and the destination devices which passively receive that broadcast advertisement initiate entry to the multicast network by sending their individual requests to the source. In one embodiment, the advertisement message may comprise information on the type of transmission method, i.e. whether the transmission method is multicast, broadcast or unicast. In another embodiment, the advertisement message may comprise information on the content type, i.e. whether the packet carries A/V, IP, or some other type of data. In certain embodiments the advertisement message may carry both information on the type of transmission method and information on the type of content of the transmission.

Figure 2A:
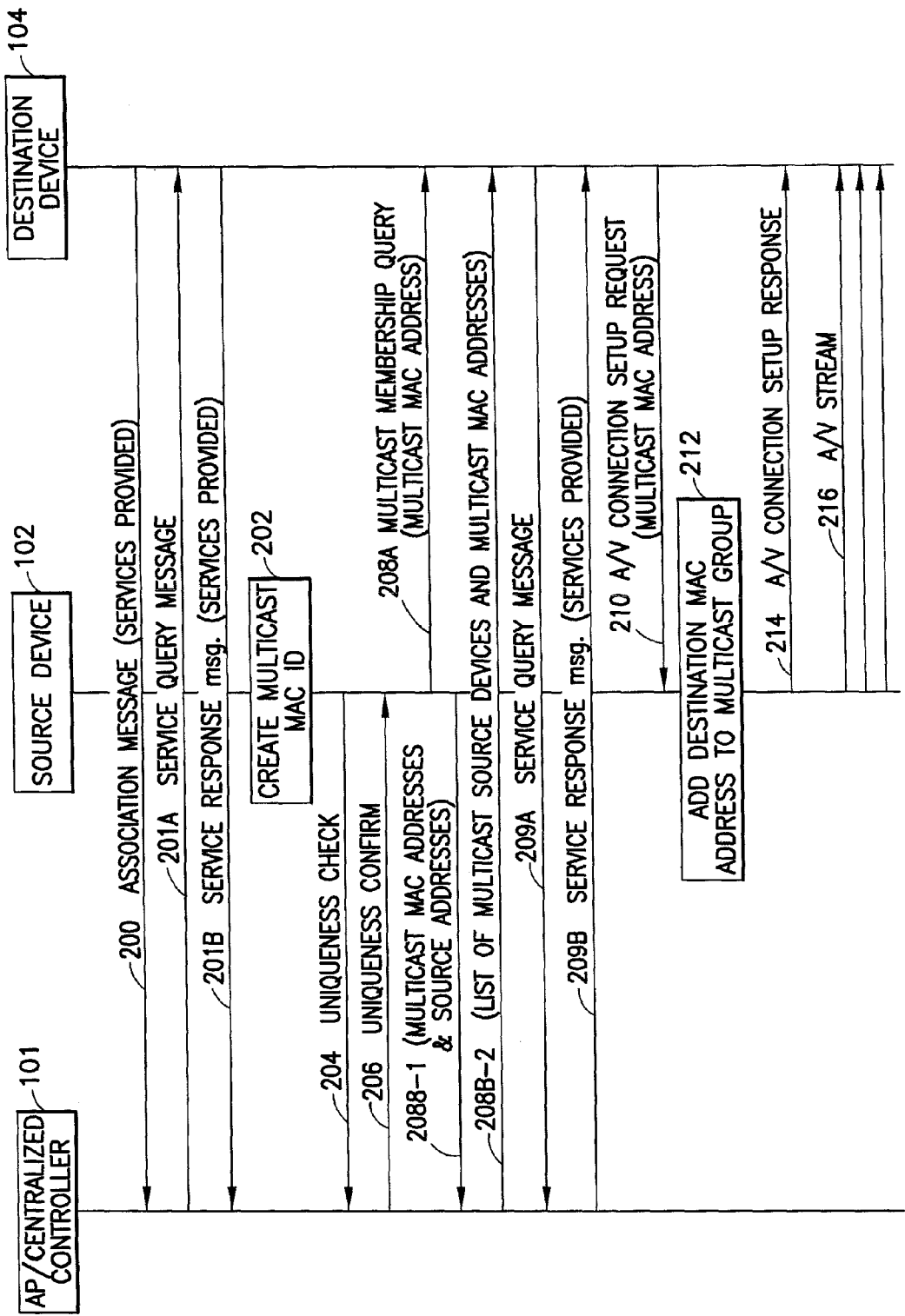

According to one embodiment, the centralized controller may be queried by the destination devices and/or the centralized controller advertises the available services in the network. The centralized controller is informed about the services that are provided by devices in the network either implicitly or explicitly. A centralized controller implicitly learns about the service provided by devices in the network by the unique MAC address query 204 (FIG. 2A) from the devices, and the devices may periodically update the centralized controller about the service continuity to be able to continue to use the Multicast MAC address assigned for the service. In addition, or as an alternative, a centralized controller may explicitly learn about the services provided by devices in the network by sending a query message 201A (FIG. 2A) to the devices asking them to respond back with the services that they are providing. The service response message 201B at FIG. 2A is the response from the devices to the PCP/AP query message 209A. Also, when devices are joining a network they may already include the services they are providing as part of the association message 201 (FIG. 2A), but this would not include any multicast services.

The source device can get the multicast advertisement to the destination devices in either of two exemplary but non-limiting ways: it may broadcast it directly, or it may have the advertisement sent from a centralized node. These are detailed further with reference to FIG. 2A. The advertisement of the service may include details of the service description like, the MAC address used for the service (which can be different from the source device MAC address), type of data (IP based, non-IP based (PAL)), etc.

Whether this advertisement message is broadcast from the source 102 itself or from a non-source centralized node, the destination devices 104A-D are able to join the A/V multicast group or groups at any time by sending to the multicast source device an A/V Connection Setup Request message.

Regardless of whether the centralized node or the source broadcasts the advertisement, in an exemplary embodiment of the invention there is a centralized controller/database 101 which tracks MAC destination addresses. The A/V multicast source device 102 queries this centralized database 101 to ensure that the MAC address of the multicast group that it uses for each of its multicast A/V streams is unique. In an exemplary embodiment, the source device 102 does this by sending a Request frame with the multicast ID that the source 102 has created for the A/V stream (one ID per stream), to which the centralized controller 101 responds with a Response frame indicating whether or not the ID is unique and can at the same time allocate the MAC address to be used for the Multicast Group. This same exchange makes the centralized controller aware of the multicast stream(s) in the network, defined by the source device address and the used multicast address per stream. In another embodiment, the source device may request a unique multicast id, which the centralized controller then generates and informs to the source device. In yet another embodiment, the source device may generate a multicast id with some technique (e.g. based on some source device related identifiers) that tries to ensure that the multicast id is unique, and this may avoid the need to check uniqueness from a centralized controller.

An exemplary signaling diagram illustrating particular embodiments of the invention is shown at FIGS. 2A-B, with the centralized controller 101 also being the AP, a single source device 102 and a single destination device 104 (recognizing that all destination devices will act similarly). FIGS. 2A-B assume one multicast stream. Embodiments with two or more such streams follow similar exemplary signaling except with the addition that there will be a different MAC address for each distinct stream.

At 202 the source 102 creates a multicast MAC identity for the multicast group and at 204 checks with the centralized controller 101 whether it is unique. At 206 the centralized controller 101 can do one of the following: 1) confirm that the created ID is unique and if it is not, the centralized controller assigns the MAC identity; 2) if it is not a unique MAC identity the centralized controller signals to the source that it is not unique, after which the source 102 creates a new one and checks again for uniqueness, iterating until a unique MAC address is found for the multicast stream. Alternately the source can request the centralized controller for a unique Multicast MAC address for the stream and the centralized controller responds back with the MAC identity to be used for the stream.

The multicast MAC address chosen to transmit the stream by the source device 102 should be unique in the layer 2 broadcast domain. Following is one exemplary technique the source 102 may use in order to construct a 48 bit MAC address which has a high probability of being unique:

Use the IANA Ethernet multicast address range from 0x01.00.5e.00.00.00 to 0x01.00.5e.7f.ff.ff as bits 1-25 (prefix).
Use 7 LSBs from the source device MAC address as bits 26-32.
Use 8 LSBs from the Association Identifier AID values as bits 33-40.
Use A/V PAL StreamID (8 bits) as bits 41-48.

In the source device 102 the multicast MAC address creation 202 may be a part of the MAC sublayer functionality. In this case the A/V PAL may not be aware of the multicast MAC address. The A/V PAL will provide the StreamID of the service to the MAC sublayer to identify the multicast stream.

Message 208A and/or 208B-2 represent the broadcast advertisement which advertises the available A/V multicast stream that the source 102 is providing. Two implementations for this advertisement message are detailed, and either can be used separately or both can be used together. In a first implementation shown by message 208A, the source device 102 periodically transmits an A/V Multicast Membership Query message within the layer 2 broadcast domain. The Multicast Membership Query message includes the unique multicast MAC address (or addresses if multiple streams) and possibly the source 102 MAC address. In some embodiments the source MAC address need not be included in message 208A since the ID is implicit from the sender which is the source 102 itself. In the second implementation shown by messages 208B-1 and 208B-2, the source device 102 transmits at message 208B-1 the unique multicast MAC address and the source 102 MAC address in a separate frame/Information Element to the PCP/AP 101. In an embodiment, message 208B-1 need not be separate from message 204 so long as the multicast MAC ID sent in message 204 is unique, or if the centralized controller creates a unique multicast MAC ID itself. During the beacon time the PCP/AP 101 transmits at message 208B-2 a list of A/V multicast source devices (MAC addresses) along with the multicast MAC addresses (or if there is only one multicast then the list has only a single multicast MAC address and a single source MAC address).

Message 209A represents a service query from a destination device 104 to the PCP/AP 101, asking what services are being provided in the wireless network. Message 209B represents the response from the PCP/AP including information of the available services within the wireless network. A destination 104 joining the wireless network after the multicast membership query 208A could, for example, find out about the multicast from the response message 209B which lists services provided in the network.

Upon receiving the A/V Multicast Membership Query 208A from the AV multicast source device 102 or the A/V Multicast Information Element 208B-2 or response 209B to the service query 209A from the PCP/AP 101, a destination device 104 becomes aware of the available multicast stream and may join the multicast group by sending an A/V Connection Setup Request message 210 to the source device 102 including the desired multicast MAC address. The initiative to join is implementation specific i.e. it may require user interaction at a user interface of the destination device 104, or it may be automatic.

After receiving the A/V Connection Setup Request message 210 from a destination device 104, the source device(s) 102 adds the destination's MAC ID to its stored list for the multicast group 212 and responds with an A/V Connection Setup Response message 214 to acknowledge destination device 104. The destination device 104 considers itself part of the multicast group after receiving the A/V Connection Setup Response message 214 for as long as it is receiving the AV multicast stream 216. Also, the source device can send a request to the devices that are part of the Multicast Group, to see if they are still interested in the group (either a PAL layer message or a Layer 2 message). By example this is shown at FIG. 2B as message 220. In an exemplary embodiment the source device 102 can begin transmitting the A/V stream 216 at any time though in FIG. 2A it begins after the connection with the destination device 104 has been set up. In an embodiment the destination device 104 can join at any time during streaming or even without streaming.

FIG. 2B continues FIG. 2A and shows termination of the stream 216 at the destination device 104 according to an example embodiment. There are two different ways by which the destination may terminate its reception. First, when the destination device 104 is no longer receiving the multicast stream 216, it considers itself not part of the multicast stream after a predetermined time-out period 218.

While transmitting the stream 216, the AV multicast source device 102 may also send periodic A/V Multicast Membership Query messages 220 to maintain its multicast group(s). The source device 102 considers a destination device 104 part of a multicast group while it is receiving A/V Multicast Membership Report messages 222 from the destination device as a response. If the destination device 104 is no longer receiving the A/V stream 216, it will not send its Report message 222. When the source device 102 is no longer receiving any A/V Multicast Membership Report message 222 from the destination device 104, it consider the destination device 104 not part of the multicast group at 226 and deletes the destination MAC ID from its listing of destination devices that are within the multicast group.

As a second termination method, the destination device 104 may actively indicate that it is leaving the multicast group by sending an A/V Connection Termination Request message 224 to the source device 102. After receiving the A/V Connection Termination Request message 224 the source device 102 also removes the destination device 104 from the multicast group and responds with an A/V Connection Termination Response message 228.

In an embodiment, the source device 102 may beamform its transmitted A/V stream 216 to the multicast group/destination devices 104A-D. Depending on the beamform directions to the destination devices 104A-D (whose position may be changing dynamically where for example one or more of them are mobile devices), the source device may choose to convert its A/V stream 216 from multicast to unicast. Specifically, if there are two destination devices for example which are very close in direction from the source device, then the source MAC can choose to put the multicast MAC address in the Destination Address DA and transmit once in that direction. If the two destinations turned out to be located at very different directions from the source device 102, then the MAC in the source device 102 would have to convert into unicast and transmit twice if it changed from multicast to unicast. But this relates to the physical and MAC layers which deliver the stream, and the PAL is unaware of how the stream is delivered. So whether the source device 102 uses beamform multicasting or unicasting is a decision to be taken at the source device 102 itself, depending on the directions of the destination devices and whether they are moving or not. The destination device may provide information (received quality of data) to the source device to help the source device to make a decision about Multicast or Unicast transmission.

In the wireless network detailed above, the source device 102 and the destination devices 104A-D are distributed stations, and distinct from the centralized controller 101. In an embodiment, these stations are in a slave relation to the centralized controller which is in a master relation to them.

Certain exemplary embodiments of the invention offer the following technical advantages. By using multicast the WGA MAC is able to optimize the radio air time usage, which may increase network capacity and decrease power consumption. This is an important consideration in the case of very high bit rate A/V streams. The multicast capability enables many new use cases for AV streaming, for example streaming a wireless display to multiple display devices as is illustrated at FIG. 1.

Figure 3A:
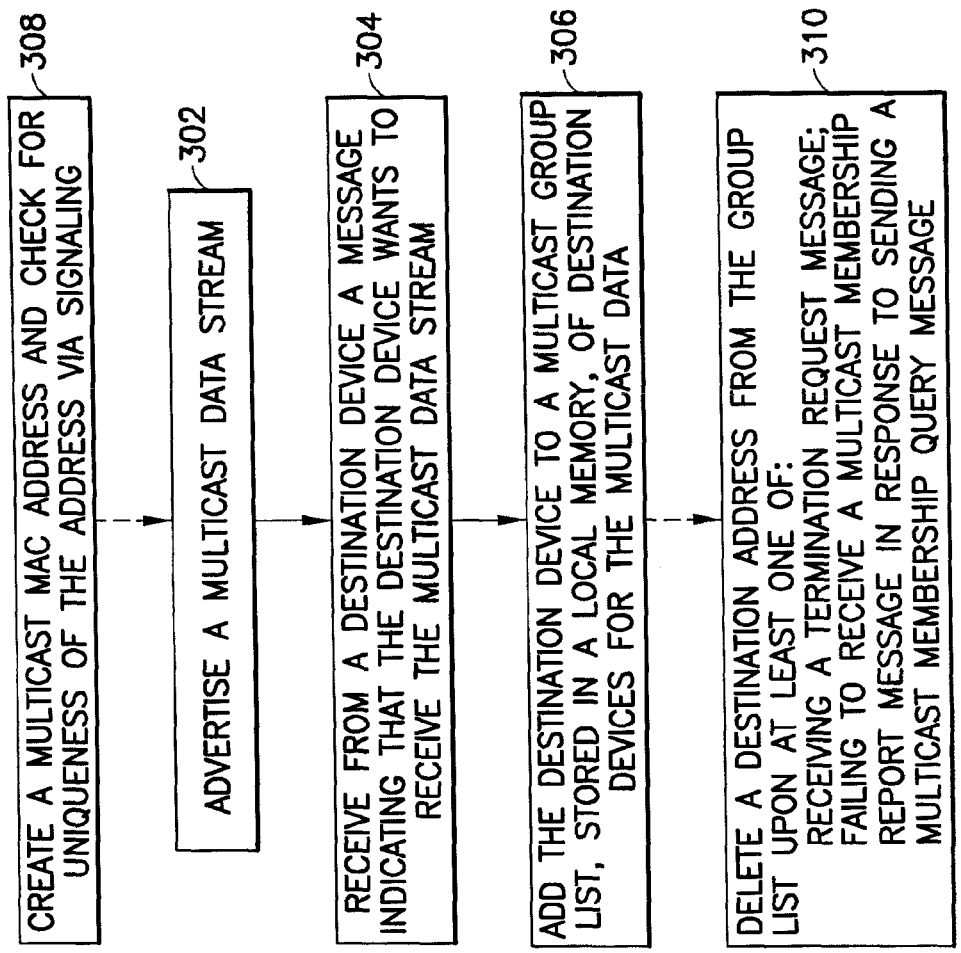
FIG. 3A is a logic flow diagram that illustrates the operation from the perspective of the source device of a method, and a result of execution of computer program instructions embodied on a computer readable memory, in accordance with an exemplary embodiments of this invention.

An exemplary embodiment of the invention from the perspective of the source device 102 is shown at FIG. 3A, which represents method steps according to an exemplary embodiment of the invention, actions which result from execution by a processor of program instructions that are stored on a memory, or functional steps taken by an apparatus such as a source device 102 shown at FIG. 1 and in further detail at FIG. 4. At block 302 the source device, which is a distributed device and not a wireless network access point, advertises a multicast data stream. At block 304 the source device receives (e.g., in response to the advertising) from a destination device a message indicating that the destination device wants to receive the multicast data stream, and at block 306 the source device adds the destination device to a list of destination devices for the multicast data stream. The list is stored in a local computer readable memory of the source device.

The following portions of FIG. 3A are optional and may be combined with blocks 302, 304 and 306 individually or in any combination. In specific implementations the advertisement includes a multicast MAC address; the advertisement is sent in a protocol adaptation layer; the multicast data stream is one or more A/V streams each having a separate multicast MAC address; the source device adds the destination device to the list by adding the MAC ID of the destination device to a multicast group list; and/or the source then streams the multicast data stream to all destination MAC addresses in the multicast group list. At block 308, prior to advertising, the source device 102 creates a multicast MAC address and may check for uniqueness of the address via signaling (e.g., signaling with the centralized controller 101). In an exemplary embodiment the multicast MAC address is created using the 48-bit procedure outlined above in four steps (for bits 1-25, 26-32, 33-40 and 41-48).

In one embodiment detailed at FIG. 2A, the advertising of block 302 comprises the source device broadcasting a multicast membership query message, in which that query message comprises the multicast MAC address and an address for the source device. In a different embodiment detailed at FIG. 2A, the advertising of block 302 comprises sending from the source device to a centralized controller a first message 204 comprising the multicast group address and possibly an address for the source device. After receiving the first message, the centralized controller may broadcast a message 208B-2 to destination devices.

In still another embodiment which may be combined with any of the above options for FIG. 3A, adding the destination to the list at block 306 comprises receiving A/V Connection Setup Request messages from a plurality of unique destinations, in which each received A/V Connection Setup Request message comprises the multicast MAC address, and adding to the group list a destination address for each of the unique destinations from which the request message was received.

In yet other embodiments which may be combined with any of the above options for FIG. 3A and which are shown by example at FIG. 2B, at block 310 the source device deletes a destination address from the group list upon at least one of: receiving a termination request message 224 from a destination device that is associated with the destination address to be deleted, and failing to receive a multicast membership report message 222 from a destination device that is associated with the destination address to be deleted in response to sending a multicast membership query message.

Figure 4A:
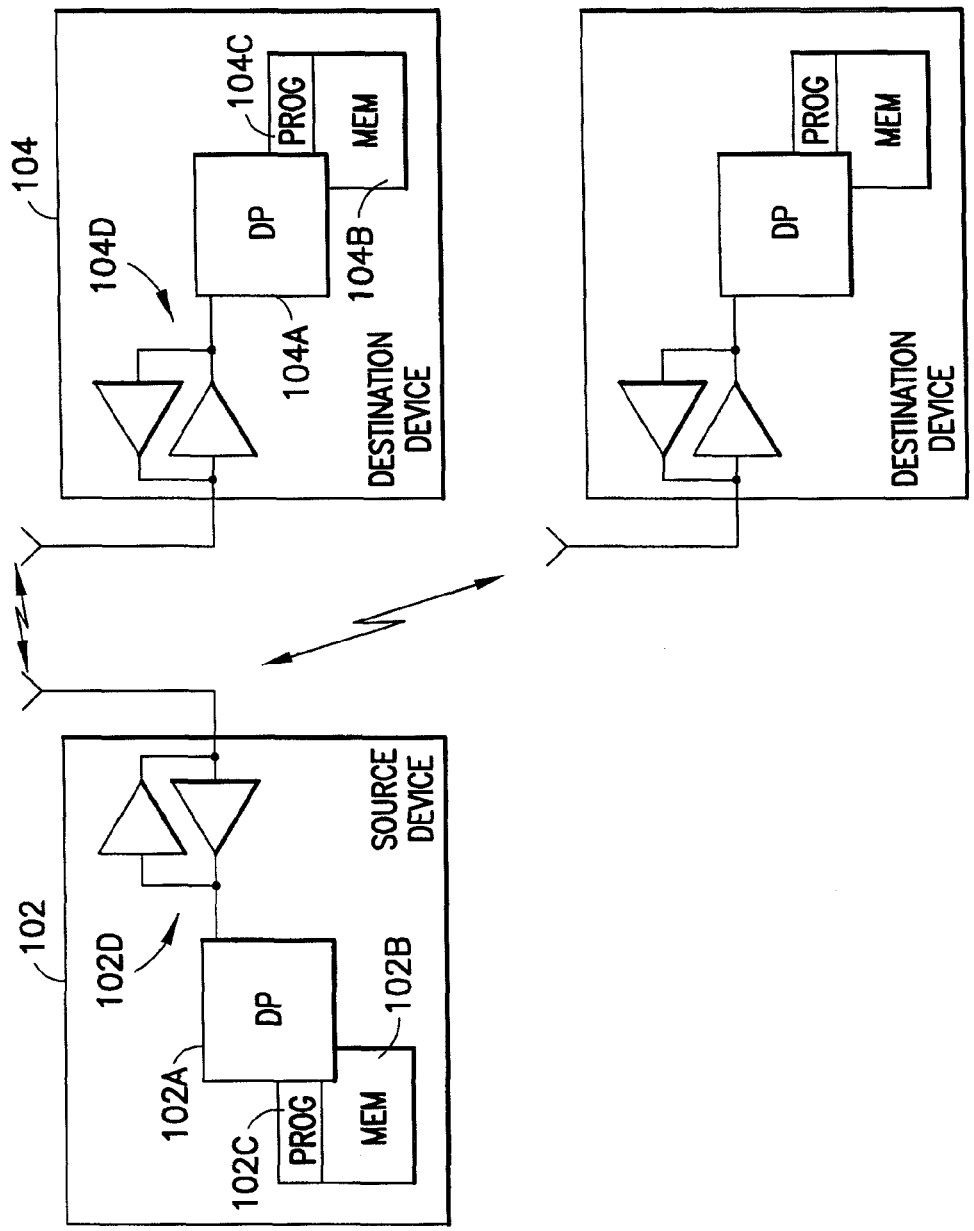
FIG. 4A shows a simplified block diagram of various electronic devices such as the source and destination devices of FIG. 1 that are suitable for use in practicing the exemplary embodiments of this invention.
Figure 4B:
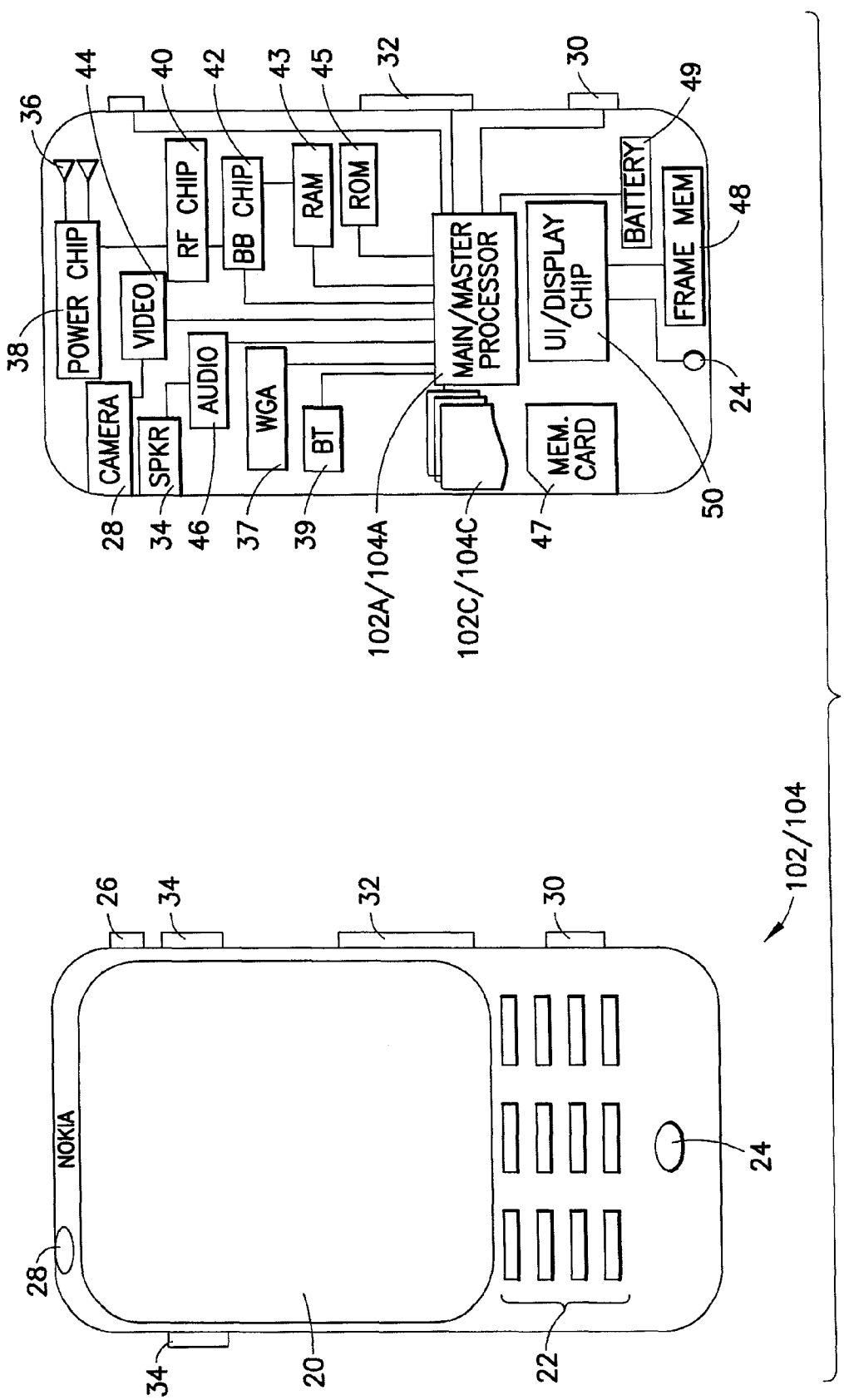
FIG. 4B shows a more detailed schematic diagram of a mobile station/user equipment which may operate as the source device or the destination device according to embodiments of the invention.

In an embodiment consistent with FIG. 3A, there is an apparatus such as for example the source device 102 or one or more components thereof (such as for example a chipset or interconnected processors and memories), comprising a processor, a memory and a transceiver (details at FIGS. 4A-B) that is/are configured to advertise a multicast data stream, to receive from a destination device a message indicating that the destination device wants to receive the multicast data stream, and to add the destination device to a list of destination devices for the multicast data stream, in which the list is stored in a local memory. FIGS. 4A-B illustrate an exemplary device with processors, memories and stored programs.

An exemplary embodiment of the invention from the perspective of a destination device 104 is shown at FIG. 3B, which represents method steps according to an exemplary embodiment of the invention, actions which result from execution by a processor of program instructions that are stored on a memory, or functional steps taken by an apparatus such as a destination device 104A-D shown at FIG. 1 and in further detail at FIG. 4. At block 320 the destination device, which is a distributed device and not a wireless network access point, receives an advertisement for a multicast data stream. At block 322 the destination device sends a message requesting to receive the multicast data stream. And at block 324 which follows the request of block 322, the destination device receives the multicast data stream.

The following portions of FIG. 3B are optional and may be combined with blocks 320, 322 and 324 individually or in any combination. In specific implementations the advertisement includes a multicast MAC address; the advertisement is received in a protocol adaptation layer; the multicast data stream is one or more A/V streams each having a separate multicast MAC address in the advertisement; and/or the request includes a multicast MAC address for the data stream which the destination device receives in the advertisement. In one embodiment shown at FIG. 2A the advertisement of block 320 is received from a source device of the multicast data stream, and in another embodiment also shown at FIG. 2A the advertisement of block 320 is received from an access point different from the source device. These are not mutually exclusive; both advertisements may be used or either may be used alone.

In a particular exemplary embodiment which may be combined with any of the above options for FIG. 3B, the request message at block 322 comprises an A/V Connection Setup Request, and at block 326 the destination device further receives an A/V Connection Setup Response message, which is in response to the destination device sending the request at block 322.

In another particular exemplary embodiment which may be combined with any of the above options for FIG. 3B, while receiving the multicast data stream at block 324, the destination device at block 328 periodically receives from the source address a Multicast Membership Query Message and responds to at least one of those Query Messages with a Multicast Membership Report.

In still another particular exemplary embodiment which may be combined with any of the above options for FIG. 3B, the destination device terminates reception of the multicast data stream at block 330 by at least one of: failing to respond to at least one Query Message with a Multicast Membership Report provided at block 328, and sending an A/V Termination Request to the source address.

In an embodiment consistent with FIG. 3B, there is an apparatus such as for example a destination device 104 or one or more components thereof (such as for example a chipset or interconnected processors and memories), that is/are configured to receive an advertisement for a multicast data stream, to send a message requesting to receive the multicast data stream, and to thereafter receive the multicast data stream. FIGS. 4A-B illustrate an exemplary device with processors, memories and stored programs.

The various blocks shown at either of FIGS. 3A-B may be viewed as method steps, and/or as operations that result from operation of computer program code, and/or as a plurality of coupled logic circuit elements constructed to carry out the associated function(s).

Reference is made to FIG. 4A for illustrating a simplified block diagram of various electronic devices and apparatus that are suitable for use in practicing the exemplary embodiments of this invention. In FIG. 4A there is shown a source device 102 and two destination devices, one of which 104 is detailed with specificity. These devices 102, 104 may be adapted for communication over a wireless link with one another, and with a network access node such as an access point which may be similarly configured. The source device 102 may comprise a controller, such as a computer or a data processor (DP) 102A, a computer-readable memory medium embodied as a memory (MEM) 102B that stores a program of computer instructions (PROG) 102C, and optionally a suitable radio frequency (RF) or 60 GHz transceiver 102D (shown as separate transmitter and receiver) for bidirectional wireless communications with the destination device 104 via one or more antennas. The destination device 104 may also comprise a controller, such as a computer or a data processor (DP) 104A, a computer-readable memory medium embodied as a memory (MEM) 104B that stores a program of computer instructions (PROG) 104C, and optionally a suitable RF or 60 GHz transceiver 104D (also shown as separate transmitter and receiver) for communication with the source device 102 via one or more antennas.

At least one of the PROGs 102C and 104C is assumed to include program instructions that, when executed by the associated DP, enable the device to operate in accordance with the exemplary embodiments of this invention such as those detailed above. That is, the exemplary embodiments of this invention may be implemented at least in part by computer software executable by the DP 102A of the source device 102 and/or by the DP 104A of the destination device 104, or by hardware, or by a combination of software and hardware (and firmware).

In general, the various embodiments of either or both of the source 102 and destination 104 devices can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The computer readable MEMs 102B and 104B may be of any type suitable to the local technical environment and may be implemented using any suitable data storage technology, such as semiconductor based memory devices, flash memory, magnetic memory devices and systems, optical memory devices and systems, fixed memory and removable memory. The DPs 102A and 104A may be of any type suitable to the local technical environment, and may include one or more of general purpose computers, special purpose computers, microprocessors, digital signal processors (DSPs) and processors based on a multicore processor architecture, as non-limiting examples.

FIG. 4B illustrates further detail of an exemplary mobile station, which may be operating as either or both source device 102 and destination device 104, in both plan view (left) and sectional view (right), and the invention may be embodied in one or some combination of those more function-specific components. At FIG. 4B the device 102/104 has a graphical display interface 20 and a user interface 22 illustrated as a keypad but understood as also encompassing touch-screen technology at the graphical display interface 20 and voice-recognition technology received at the microphone 24. A power actuator 26 controls the device being turned on and off by the user. The exemplary UE 10 may have a camera 28 which is shown as being forward facing (e.g., for video calls) but may alternatively or additionally be rearward facing (e.g., for capturing images and video for local storage). The camera 28 is controlled by a shutter actuator 30 and optionally by a zoom actuator 32 which may alternatively function as a volume adjustment for the speaker(s) 34 when the camera 28 is not in an active mode. The camera may serve as source of the A/V stream 216, or the memory may serve as that source, for the case where the device 102/104 acts as source device 102.

Within the sectional view of FIG. 4B are seen multiple transmit/receive antennas 36 that are typically used for cellular or 60 GHz communication. The antennas 36 may be multi-band for use with other radios in the UE. The operable ground plane for the antennas 36 is shown by shading as spanning the entire space enclosed by the UE housing though in some embodiments the ground plane may be limited to a smaller area, such as disposed on a printed wiring board on which the power chip 38 is formed. The power chip 38 controls power amplification on the channels being transmitted and/or across the antennas that transmit simultaneously where spatial diversity or beamforming is used, and amplifies the received signals. The power chip 38 outputs the amplified received signal to the radio-frequency (RF) chip 40 which demodulates and downconverts the signal for baseband processing. The baseband (BB) chip 42 detects the signal which is then converted to a bit-stream and finally decoded. Similar processing occurs in reverse for signals generated in the apparatus 102/104 and transmitted from it.

Signals to and from the camera 28 pass through an image/video processor 44 which encodes and decodes the various image frames. A separate audio processor 46 may also be present controlling signals to and from the speakers 34 and the microphone 24. The graphical display interface 20 is refreshed from a frame memory 48 as controlled by a user interface chip 50 which may process signals to and from the display interface 20 and/or additionally process user inputs from the keypad 22 and elsewhere. For either source 102 or destination 104 device, the visual component of the A/V stream 216 may be displayed at the interface 20.

Embodiments of the device 102/104 may also include one or more secondary radios such as a WGA radio 37 operating in the 60 GHz band and possibly also a Bluetooth® radio 39, either or both of which may incorporate an antenna on-chip or be coupled to an off-chip antenna such as those illustrated at 36. Throughout the apparatus are various memories such as random access memory RAM 43, read only memory ROM 45, and in some embodiments removable memory such as the illustrated memory card 47 on which the various programs 102C/104C are stored. All of these components within the device 102/104 are normally powered by a portable power supply such as a battery 49.

The aforesaid processors 38, 40, 42, 44, 46, 50, if embodied as separate entities in a source 102 or destination 104 device, may operate in a slave relationship to the main processor 102A, 104A, which may then be in a master relationship to them. Any or all of these various processors of FIG. 4B access one or more of the various memories, which may be on-chip with the processor or separate therefrom.

Note that the various chips (e.g., 38, 40, 42, etc.) that were described above may be combined into a fewer number than described and, in a most compact case, may all be embodied physically within a single chip.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of the WGA system, it should be appreciated that the exemplary embodiments of this invention are not limited for use with only this one particular type of wireless communication system, and that they may be used to advantage in other wireless communication systems. In addition, the exemplary embodiments of this invention are not limited to multicasting audio-visual streams, and the embodiments may be applied for other type of data as well.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

We claim:

1. An apparatus comprising:
  a processor; and
  a memory storing a program of computer readable instructions, the memory and the computer readable instructions configured, with the processor, to cause the apparatus at least to:
  advertise a multicast data stream by sending a generic advertisement addressed to no specific destination device without previously sending an invitation to join a multicast group, said generic advertisement announcing the multicast data stream to potential destination devices;
receive from a destination device a connection setup request message to initiate entry of the destination device into a multicast network to receive the multicast data stream;
add the destination device to a list of destination devices for the multicast data stream, said list being stored in the memory;
sending a connection setup response message to the destination device to acknowledge the destination device; and
sending the multicast data stream to the destination device, wherein the apparatus is a source device for the multicast data stream, said source device being a distributed device and not a wireless network access point.

2. The apparatus according to claim 1, in which the memory and the computer readable instructions are configured with the processor to advertise the multicast data stream by sending in a protocol adaptation layer an advertisement comprising a multicast medium access control (MAC) address.

3. The apparatus according to claim 2, in which sending the advertisement comprises broadcasting a multicast membership query message which comprises the multicast medium access control (MAC) address and an address for the apparatus which is a source device.

4. The apparatus according to claim 1, in which the memory and the computer readable instructions are configured with the processor to advertise the multicast data stream by sending from the apparatus to a centralized controller a first message comprising the multicast medium access control (MAC) address which triggers the centralized controller to broadcast an advertisement for the multicast data stream to destination devices.

5. The apparatus according to claim 1, in which the memory and the computer readable instructions are configured with the processor to add the destination device to the list by adding a medium access control identifier (MAC ID) of the destination device to a multicast group list comprising a plurality of destination devices; and thereafter to stream the multicast data stream to all destination medium access control (MAC) addresses and their corresponding destination devices in the multicast group list.

6. The apparatus according to claim 1, in which the memory and the computer readable instructions are further configured with the processor to create a multicast medium access control (MAC) address and check for uniqueness of the created address via signaling, prior to advertising the multicast data stream.

7. The apparatus according to claim 1, in which the memory and the computer readable instructions are further configured with the processor to delete a destination address from the list stored in the memory upon at least one of:
receiving a termination request message from a destination device that is associated with the destination address to be deleted; and
failing to receive a multicast membership report message from a destination device that is associated with the destination address to be deleted in response to sending a multicast membership query message.

8. A method comprising:
advertising a multicast data stream from a source device, said source device being a distributed device and not a wireless network access point, by sending a generic advertisement addressed to no specific destination device without previously sending an invitation to join a multicast group, said generic advertisement announcing the multicast data stream to potential destination devices;
receiving from a destination device a connection setup request message to initiate entry of the destination device into a multicast network to receive the multicast data stream;
adding the destination device to a list of destination devices for the multicast data stream, said list being stored in a computer readable memory;
sending a connection setup response message to the destination device to acknowledge the destination device; and
sending the multicast data stream to the destination device.

9. The method according to claim 8, in which advertising the multicast data stream comprises sending in a protocol adaptation layer an advertisement comprising a multicast medium access control (MAC) address.

10. The method according to claim 9, in which sending the advertisement comprises broadcasting a multicast membership query message which comprises the multicast medium access control (MAC) address and an address for the source device.

11. The method according to claim 8, in which advertising the multicast data stream comprises sending from the source device to a centralized controller a first message comprising the multicast medium access control (MAC) address which triggers the centralized controller to broadcast an advertisement for the multicast data stream to destination devices.

12. The method according to claim 8, in which adding the destination device to the list comprises adding a medium access control identifier (MAC ID) of the destination device to a multicast group list;
the method further comprising streaming the multicast data stream to all destination medium access control (MAC) addresses in the multicast group list.

13. The method according to claim 8, the method further comprising, prior to advertising the multicast data stream:
creating a multicast medium access control (MAC) address; and
checking for uniqueness of the created address via signaling.

14. The method according to claim 8, the method further comprising deleting a destination address from the list stored in the memory upon at least one of:
receiving a termination request message from a destination device that is associated with the destination address to be deleted; and
failing to receive a multicast membership report message from a destination device that is associated with the destination address to be deleted in response to sending a multicast membership query message.

15. A memory storing a program of computer readable instructions which when executed by a processor perform the following actions:
advertising a multicast data stream from a source device, said source device being a distributed device and not a wireless network access point, by sending a generic advertisement addressed to no specific destination device without previously sending an invitation to join a multicast group, said generic advertisement announcing the multicast data stream to potential destination devices;

receiving from a destination device a connection setup request message to initiate entry of the destination device into a multicast network to receive the multicast data stream;

adding the destination device to a list of destination devices for the multicast data stream, said list being stored in a computer readable memory;

sending a connection setup response message to the destination device to acknowledge the destination device; and sending the multicast data stream to the destination device.

16. The memory according to claim 15, in which advertising the multicast data stream comprises broadcasting in a protocol adaptation layer an advertisement comprising a multicast medium access control (MAC) address and an address for the source device.

17. The memory according to claim 15, in which advertising the multicast data stream comprises sending from the source device to a centralized controller a first message comprising the multicast medium access control (MAC) address which triggers the centralized controller to broadcast an advertisement for the multicast data stream to destination devices.

18. The memory according to claim 15, in which adding the destination device to the list comprises adding a medium access control identifier (MAC ID) of the destination device to a multicast group list;

the actions further comprising streaming the multicast data stream to all destination medium access control (MAC) addresses in the multicast group list.

19. The memory according to claim 15, the actions further comprising, prior to advertising the multicast data stream:

creating a multicast medium access control (MAC) address; and checking for uniqueness of the created address via signaling.

20. The memory according to claim 15, the actions further comprising deleting a destination address from the list stored in the memory upon at least one of:

receiving a termination request message from a destination device that is associated with the destination address to be deleted; and failing to receive a multicast membership report message from a destination device that is associated with the destination address to be deleted in response to sending a multicast membership query message.

* * * * *